(12) United States Patent
Koerner et al.

(10) Patent No.: US 9,528,389 B2
(45) Date of Patent: Dec. 27, 2016

(54) EXHAUST-GAS TURBOCHARGER

(75) Inventors: Thomas Koerner, Recklinghausen (DE); Michael Renett, Oberwiesen (DE); Johannes Hornbach, Frankenthal (DE)

(73) Assignee: BorgWarner Inc., Auburn Hills, MI (US)

( * ) Notice: Subject to any disclaimer, the term of this patent is extended or adjusted under 35 U.S.C. 154(b) by 497 days.

(21) Appl. No.: 13/882,602

(22) PCT Filed: Nov. 3, 2011

(86) PCT No.: PCT/US2011/059050
§ 371 (c)(1),
(2), (4) Date: Apr. 30, 2013

(87) PCT Pub. No.: WO2012/064575
PCT Pub. Date: May 18, 2012

(65) Prior Publication Data
US 2013/0236336 A1    Sep. 12, 2013

(30) Foreign Application Priority Data

Nov. 9, 2010    (DE) .................. 10 2010 050 840
Apr. 11, 2011    (DE) .................. 10 2011 016 714

(51) Int. Cl.
  *F01D 25/16*    (2006.01)
  *F16C 35/02*    (2006.01)
  *F02C 6/12*    (2006.01)

(52) U.S. Cl.
  CPC ............... *F01D 25/16* (2013.01); *F16C 35/02* (2013.01); *F02C 6/12* (2013.01); *F05D 2220/40* (2013.01); *F16C 2360/24* (2013.01)

(58) Field of Classification Search
  CPC .......... F04D 29/041; F16C 17/06; F16C 35/02
  USPC .......... 384/306–308; 415/104; 417/407, 365, 417/423.12; 403/355; 137/625.17
  See application file for complete search history.

(56) References Cited

U.S. PATENT DOCUMENTS

| | | | | |
|---|---|---|---|---|
| 1,336,882 A | * | 4/1920 | Bowmer | F16D 65/062 188/250 B |
| 2,021,241 A | * | 11/1935 | Mall | F16B 21/16 15/410 |
| 3,367,692 A | * | 2/1968 | Balian | F16D 1/02 285/321 |
| 4,838,711 A | * | 6/1989 | Munkel | 384/215 |
| 5,207,566 A | * | 5/1993 | Munkel | F01D 25/164 417/407 |
| 5,526,845 A | * | 6/1996 | Manos | F16K 11/078 137/625.17 |
| 6,238,096 B1 | * | 5/2001 | Allen | F16C 23/082 384/495 |
| 2010/0163215 A1 | * | 7/2010 | Li et al. | 165/120 |

* cited by examiner

*Primary Examiner* — Devon Kramer
*Assistant Examiner* — Connor Tremarche
(74) *Attorney, Agent, or Firm* — A. Michael Tucker; Stephan A. Pendorf; Patent Central LLC

(57) ABSTRACT

An exhaust-gas turbocharger with a bearing housing which receives a static bearing bush for a rotor shaft. A lug supported in the bearing housing engages the bearing bush and prevents the bearing bush from rotating but avoids a restriction of the freedom of movement of the bearing bush in the axial and radial directions.

19 Claims, 12 Drawing Sheets

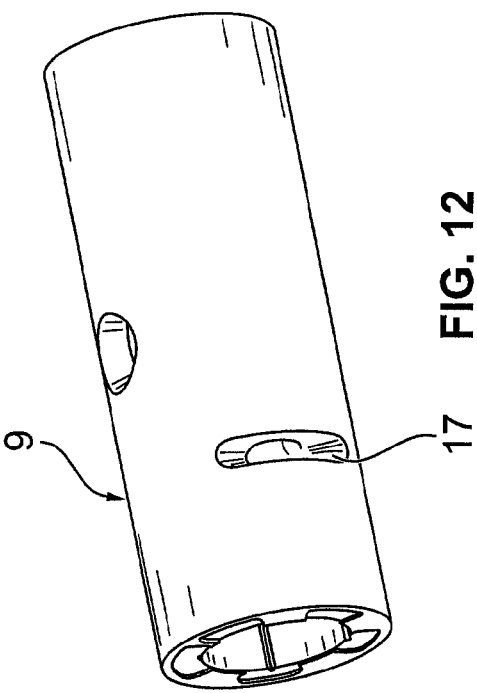
FIG. 12
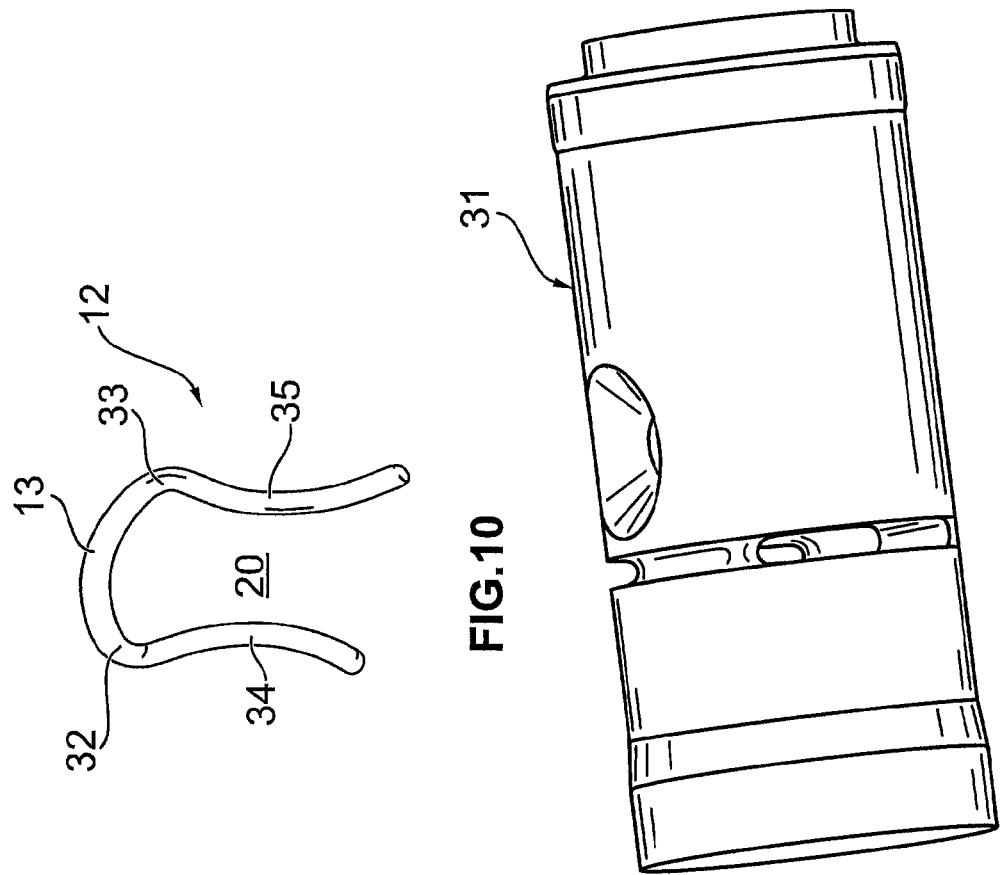
FIG. 10
FIG. 11

EXHAUST-GAS TURBOCHARGER

The invention relates to an exhaust-gas turbocharger according to the preamble of claim 1.

A generic exhaust-gas turbocharger is known from EP 0 440 917 A1. Said exhaust-gas turbocharger has a static bearing bush. The bearing bush has, in the end surface thereof, two grooves which interact with beads of a rotation prevention means designed as a locking ring. Said locking ring has not only the beads but also a tongue which engages into a recess of the bearing housing.

Said arrangement duly yields a rotation prevention action, but at the same time the freedom of movement of the bearing bush in the axial and radial directions is also restricted.

It is therefore an object of the present invention to provide an exhaust-gas turbocharger of the type specified in the preamble of claim 1, the rotation prevention means of which can prevent the bearing bush from rotating but avoids a restriction of the freedom of movement of the bearing bush in the axial and radial directions.

Said object is achieved by means of the features of claim 1.

Aside from achieving the stated object, the design according to the invention also yields the advantage that an external trapped-oil damper of the exhaust-gas turbocharger is not adversely affected in terms of its function. The inner plain bearing of the bearing housing of the exhaust-gas turbocharger may furthermore simultaneously be optimized with regard to the constant-tone problem. This is possible for example by virtue of the bearing surfaces being designed asymmetrically, such that different lubricating films can build up. Other measures for optimizing the acoustic problems of the exhaust-gas turbocharger according to the invention are however also possible.

The subclaims relate to advantageous refinements of the invention.

The rotation prevention means according to the invention is arranged so as to be supported via the at least one lug, but preferably three lugs, in the bearing housing, for example by means of engagement into associated recesses. Here, this firstly achieves the advantage that mistake-free installation is ensured during the assembly of the exhaust-gas turbocharger. At the same time, the rotation prevention means according to the invention is fixedly clamped by means of the lug or lugs between an axial bearing of the bearing housing and the bearing housing. It is therefore possible to dispense with additional fastening elements such as for example locking rings. The rotation prevention means has, in a main region, a receiving recess into which an end region of the bearing bush can be inserted, for which purpose said bearing bush has two diametrically oppositely arranged grooves, such that two wall regions, which are arranged opposite one another and which delimit the receiving recess, of the rotation prevention means can be inserted into the grooves.

As a result of said arrangement of grooves arranged diametrically opposite one another and of a receiving recess in the rotation prevention means, it is made possible firstly to realize a rotation prevention action for the bearing bush and secondly to avoid a restriction of the mobility of said bearing bush in the axial and radial directions, since it is possible for the grooves of the bearing bush to be formed so as to be wider than the sheet-metal thickness of those wall regions of the rotation prevention means which engage into the grooves. In this way, the axial freedom of movement can be ensured, including the required axial play for the rotor.

Here, the function of the axial bearing of the bearing housing is preferably not influenced, and furthermore, it is possible to avoid a variation of the axial forces acting on the axial bearing.

The freedom of movement of the bearing bush in the radial direction is likewise not restricted by the described design.

Further details, advantages and features of the present invention will emerge from the following description of an exemplary embodiment on the basis of the appended drawing, in which.

Figure 9:
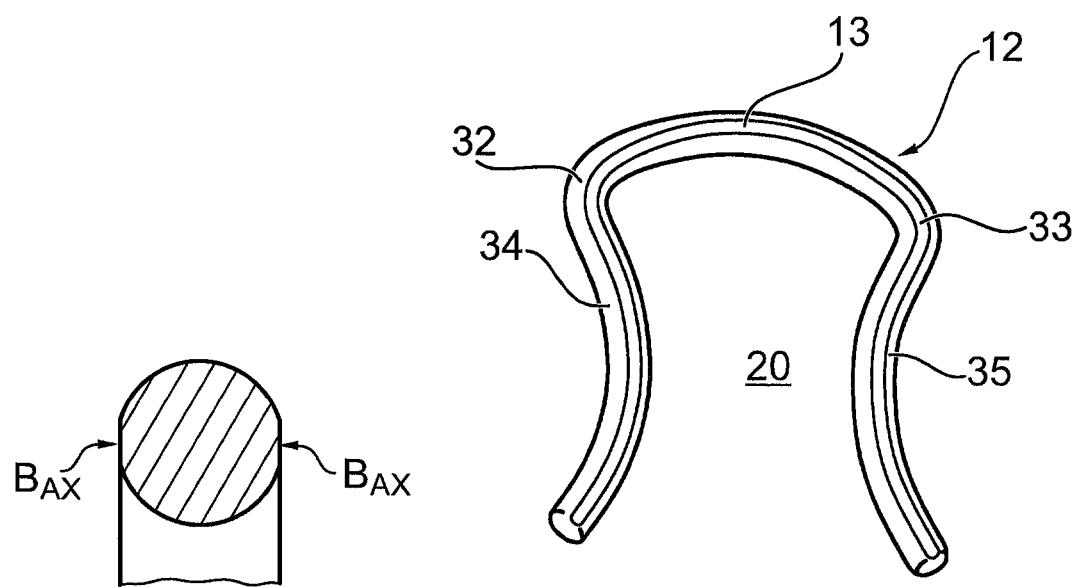
Figure 14:
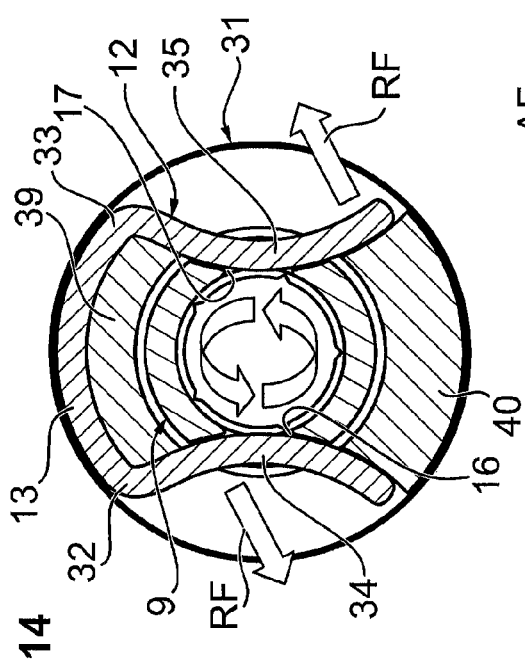
Figure 15:
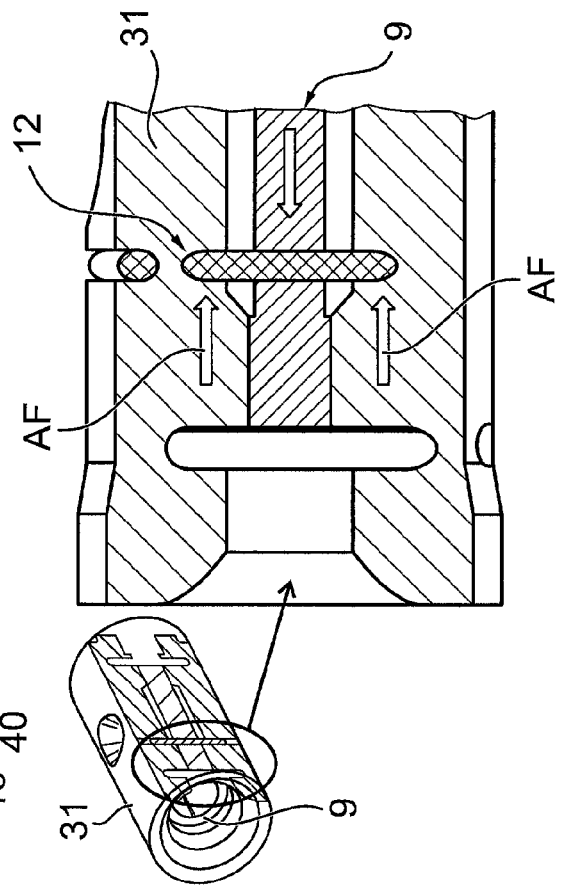
Figure 13:
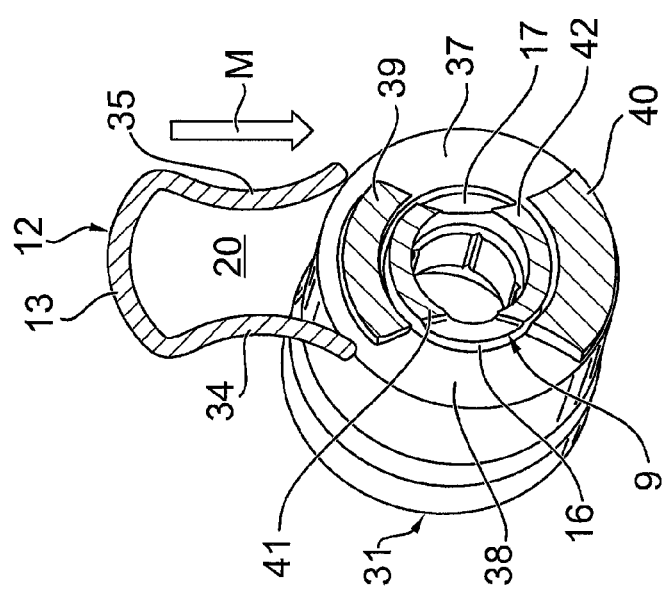

FIG. 9 shows an illustration of a rotation prevention means, designed as a spring clip, of the exhaust-gas turbocharger according to the invention, FIGS. 10 to 12 show further illustrations of the spring clip, of the bearing sleeve and of the bearing bush in a perspective view, FIG. 13 shows a sectional illustration through the bearing sleeve and the bearing bush together with the spring clip, before the mounting of the latter, FIGS. 14 and 15 show illustrations of the assembled unit composed of bearing sleeve and bearing bush using the spring clip.

Figure 16:
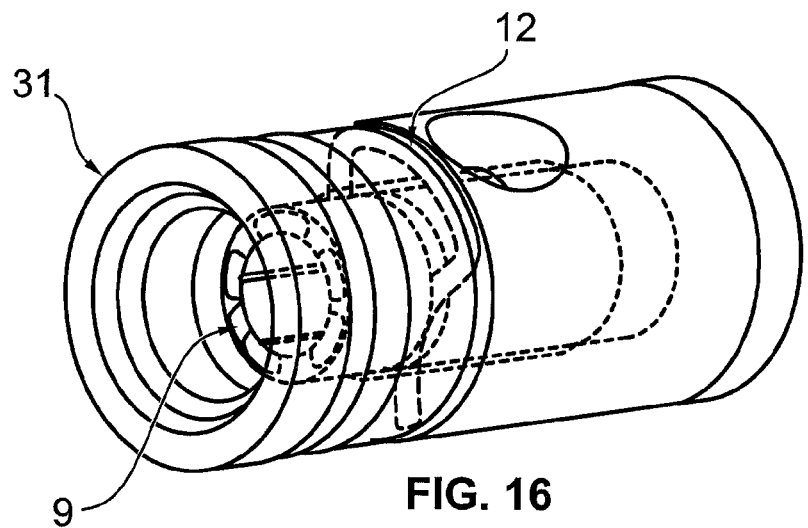
Figure 17:
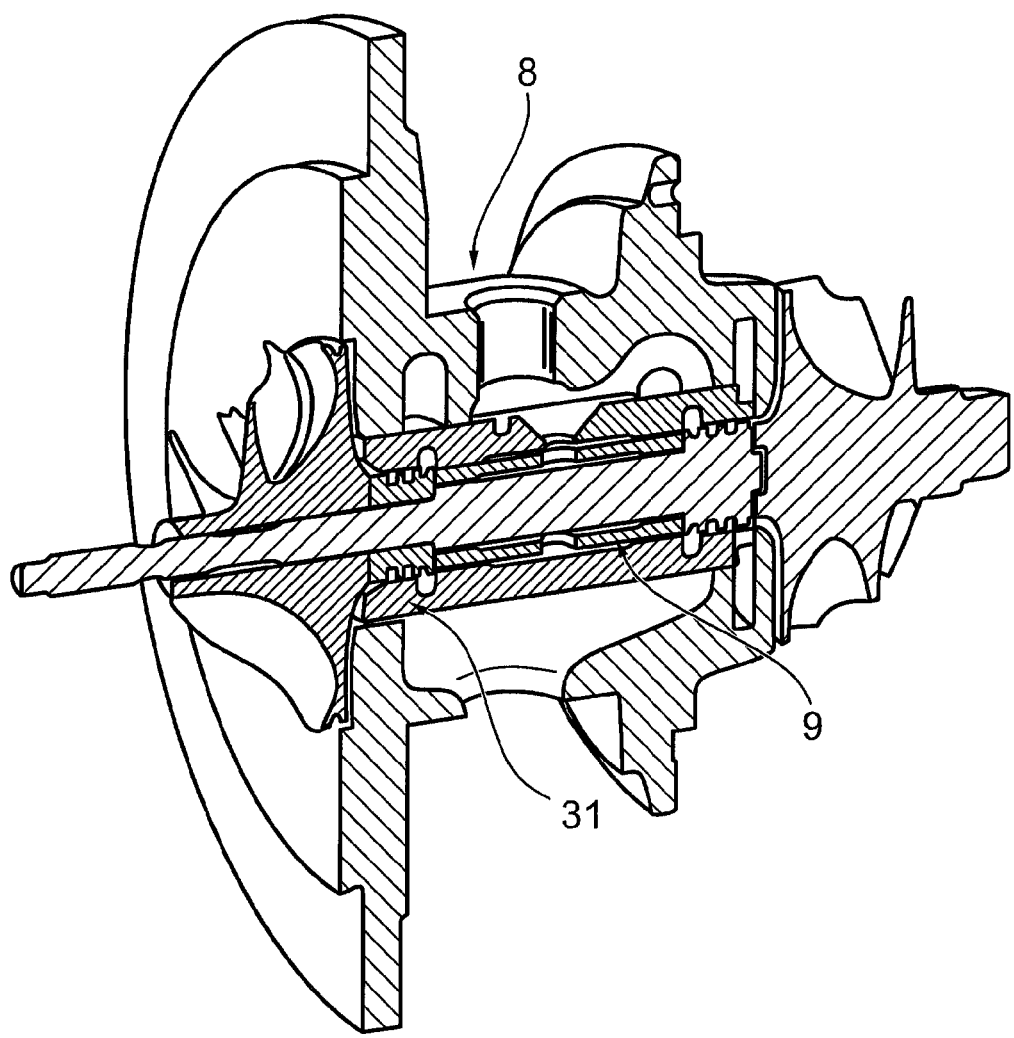
Figure 18:
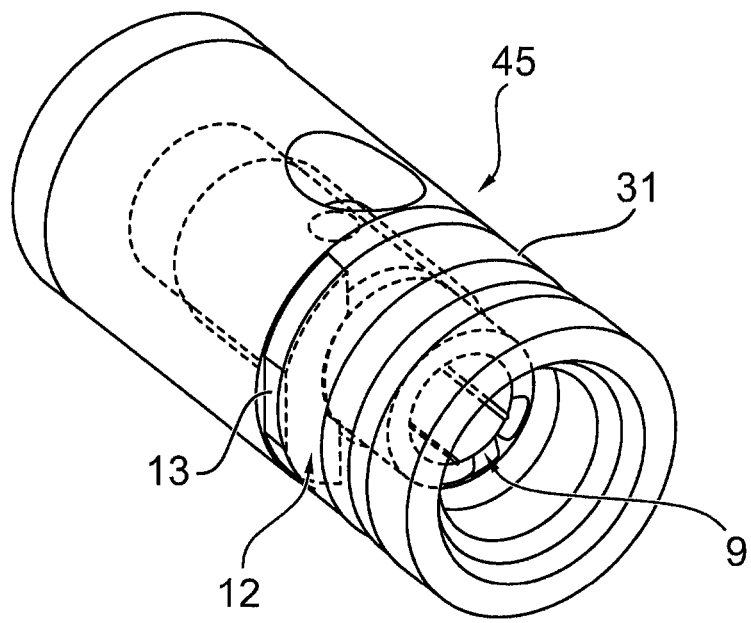
Figure 19:
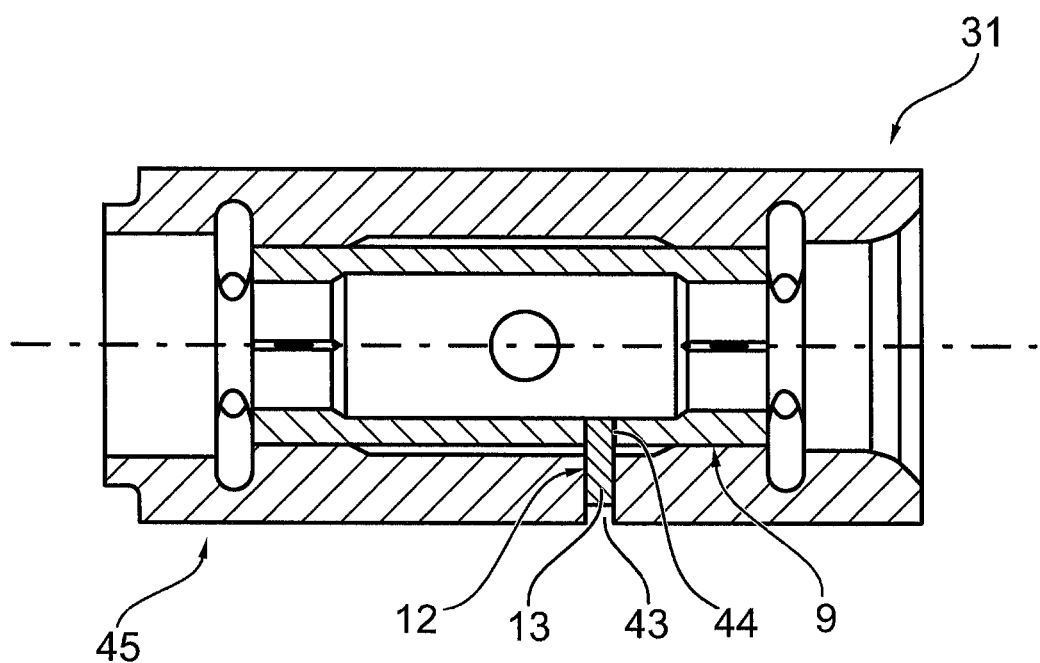

FIG. 16 shows a perspective illustration of the bearing sleeve and of the bearing bush, with the spring clip mounted thereon, as a preassembled structural unit, FIG. 17 shows a sectional perspective illustration of a bearing housing with the bearing bush-bearing sleeve arrangement according to FIG. 16 installed therein, and FIG. 18 shows an illustration, corresponding to FIG. 16, of a structural unit with bearing sleeve and bearing bush, and FIG. 19 shows a sectional illustration through the structural unit according to FIG. 18.

Figure 1:
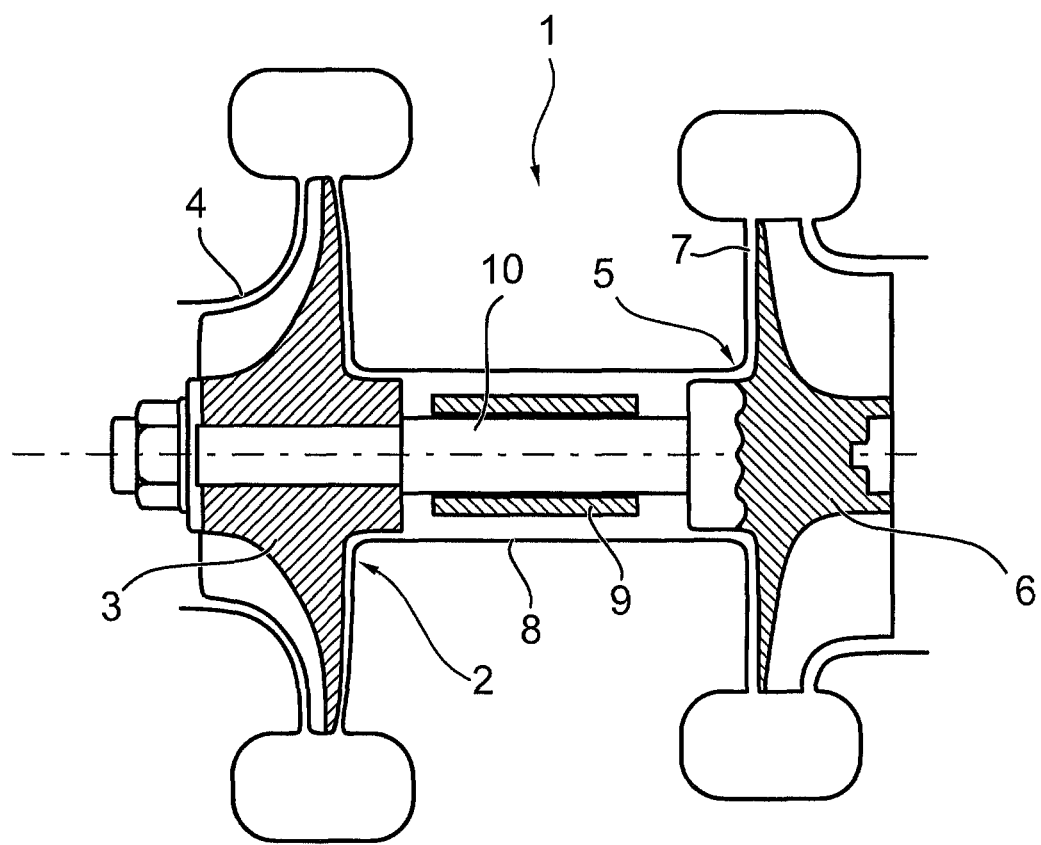
FIG. 1 shows a schematically highly simplified illustration of an exhaust-gas turbocharger according to the invention for explaining the basic components thereof.

FIG. 1 shows a schematically highly simplified illustration of an exhaust-gas turbocharger 1 according to the invention which has a compressor 2 with a compressor wheel 3 in a compressor housing 4.

The exhaust-gas turbocharger 1 also has a turbine 5 which has a turbine wheel 6 in a turbine housing 7.

Figure 4:
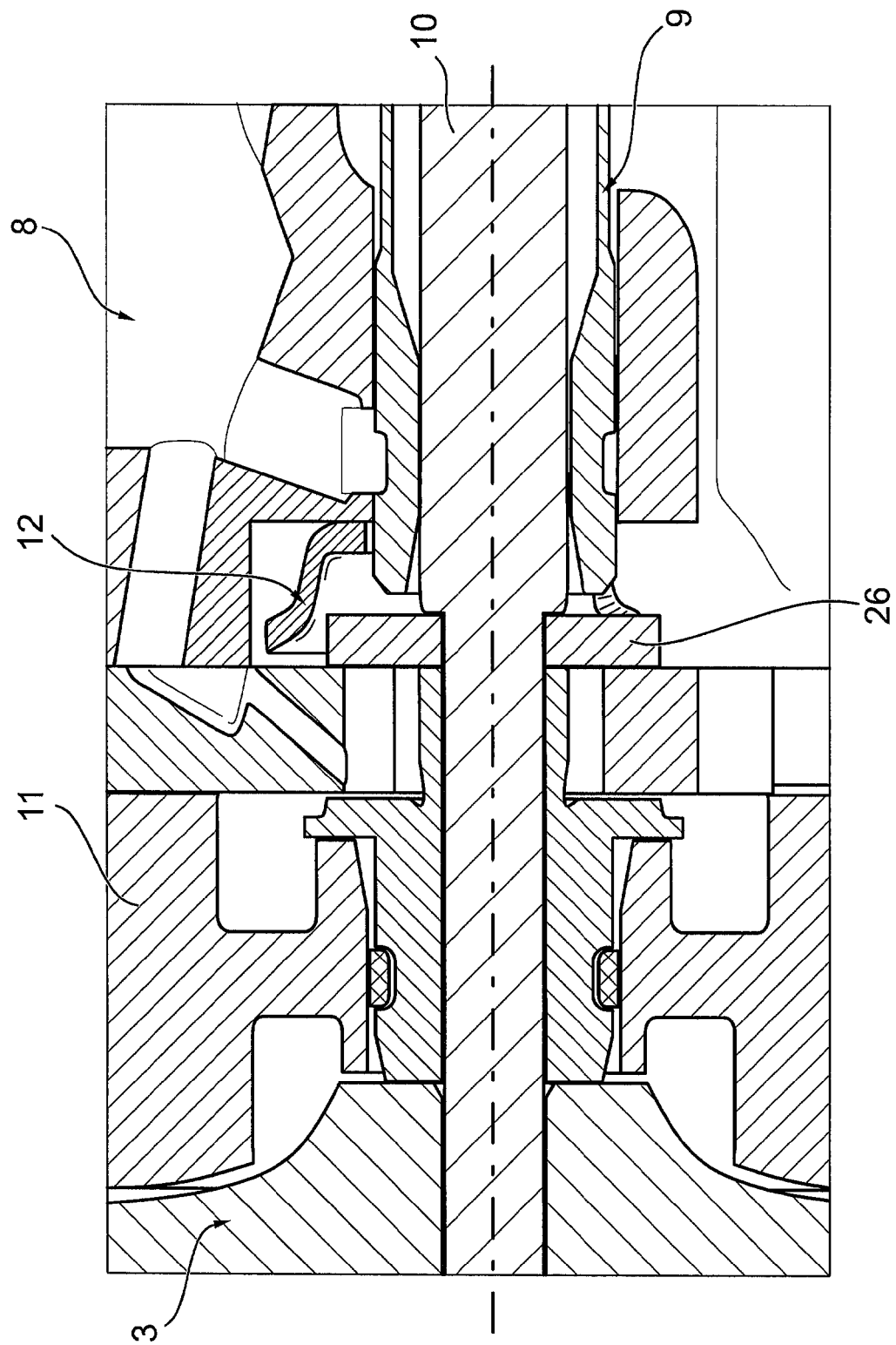
FIG. 4 shows a sectional illustration through a part of the bearing housing in which the rotation prevention means is arranged.

Arranged between the compressor housing 4 and the turbine housing 7 is a bearing housing 8 which accommodates a static bearing bush 9 for a rotor shaft 10 and which, as per the illustration of FIG. 4, has a bearing housing cover 11 at the compressor side.

The exhaust-gas turbocharger 1 according to the invention self-evidently also has all the other components of such bearings, the description of which is however not necessary for explaining the principles of the present invention.

Figure 2:
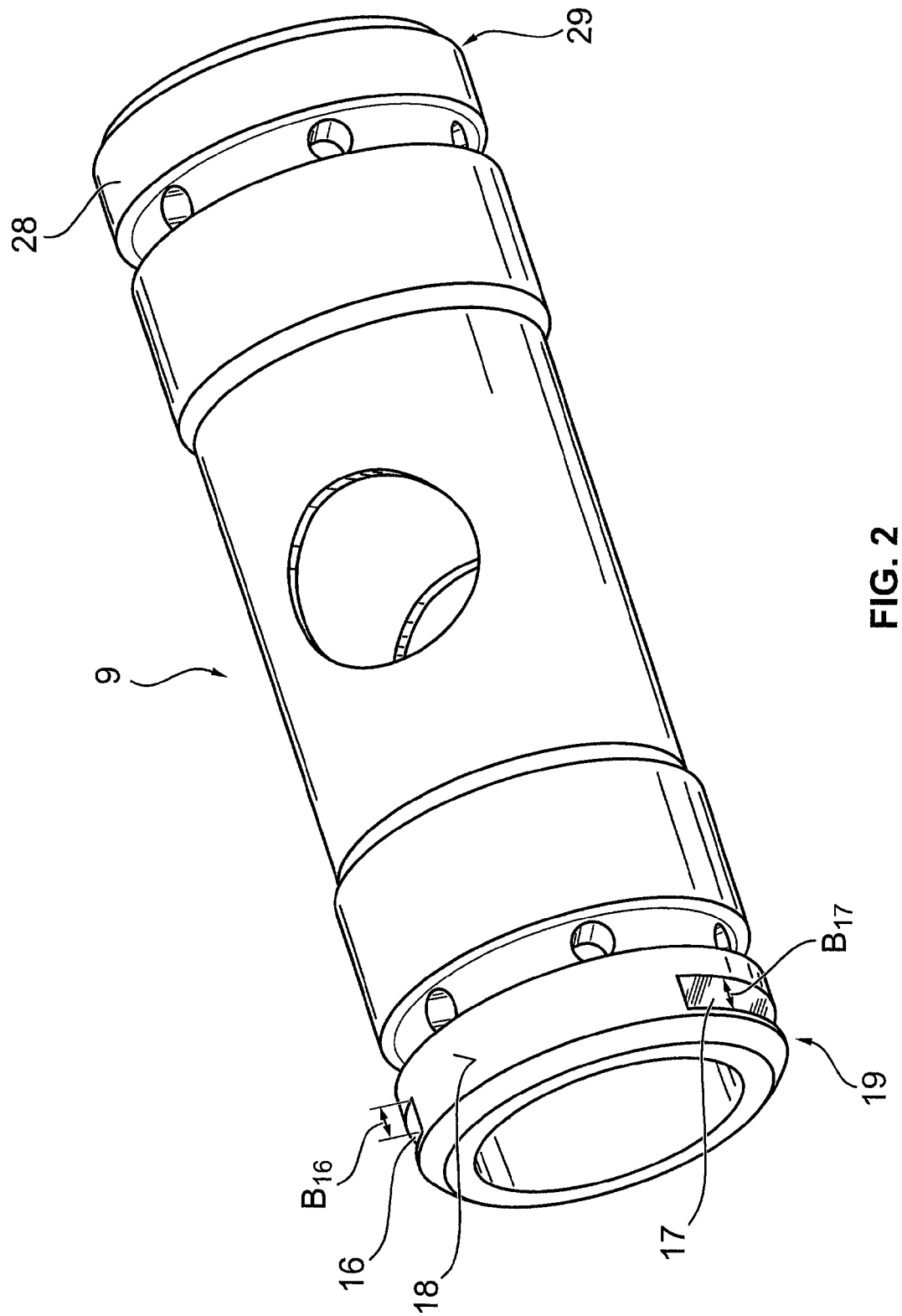
FIG. 2 shows a perspective illustration of a bearing bush of the exhaust-gas turbocharger according to the invention.

FIG. 2 illustrates a perspective illustration of the bearing bush 9 which is mounted in the bearing housing 8 for the purpose of mounting the rotor shaft 10.

The bearing bush 9 has, at one end region 19, two grooves 16 and 17 which are arranged opposite one another and which are arranged in an outer circumferential region 18 of the end region 19. The grooves 16 and 17 consequently open to the outside, as can be seen from FIG. 2.

The bearing bush also has, on the outer circumference thereof, support regions such as the support region 28 at the opposite end region 29, by means of which support regions the bearing bush 9, in the mounted state, is supported in the inner bore of the bearing housing. This can be seen in particular from the illustration of FIGS. 4, 5 and 6, but is not of significance for explaining the principles of the present application.

Figure 3:
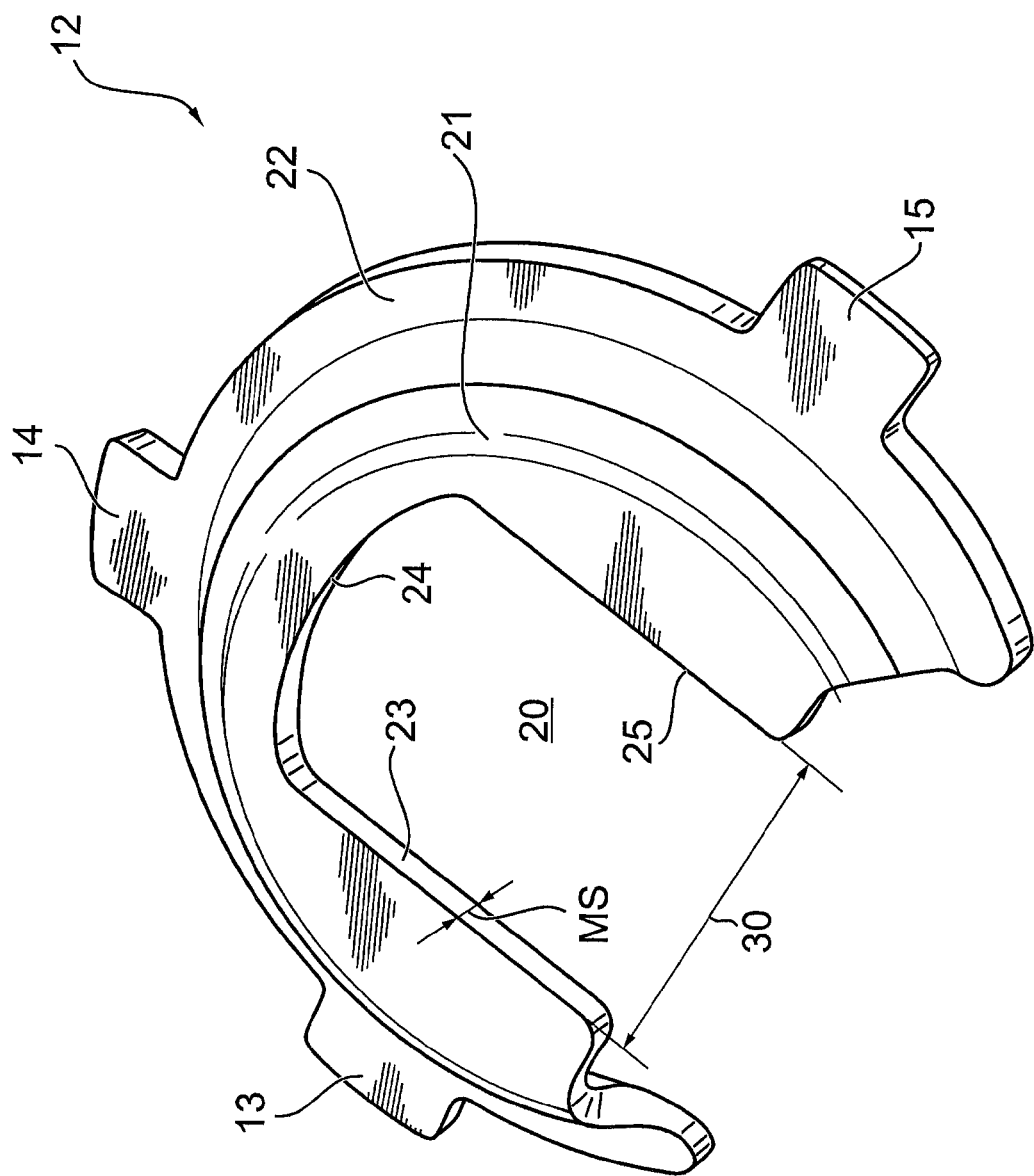
FIG. 3 shows a perspective illustration of a rotation prevention means of the exhaust-gas turbocharger.

FIG. 3 shows a rotation prevention means 12 of the exhaust-gas turbocharger 1 for the bearing bush 9. The rotation prevention means 12 has a central main region 21 which is domed in the manner of a bowl and in which a receiving recess 20 is centrally arranged. The receiving recess 20 is delimited by two wall regions 23 and 25 which are arranged opposite one another and which run rectilinearly. The receiving recess 20 is also delimited by a slightly domed wall region 24 which connects the wall regions 23 and 25 to one another. This therefore yields the design of the receiving recess 20 which can be seen in FIG. 3, which is open at one side and which therefore has an insertion region 30 into which the bearing bush 9 can be inserted, as can be seen in particular from the illustration of FIGS. 5 and 6.

The rotation prevention means 12 also has an edge region 22 which adjoins the main region 21 at the outer edge thereof, which edge region 22 runs around the main region 21 and is provided, in the example, with three lugs 13, 14 and 15. In the example, the lugs 13, 14 and 15 are arranged distributed at uniform intervals on the edge region 22 and extend radially outward from the latter, as can be seen in detail from FIG. 3.

Figure 5:
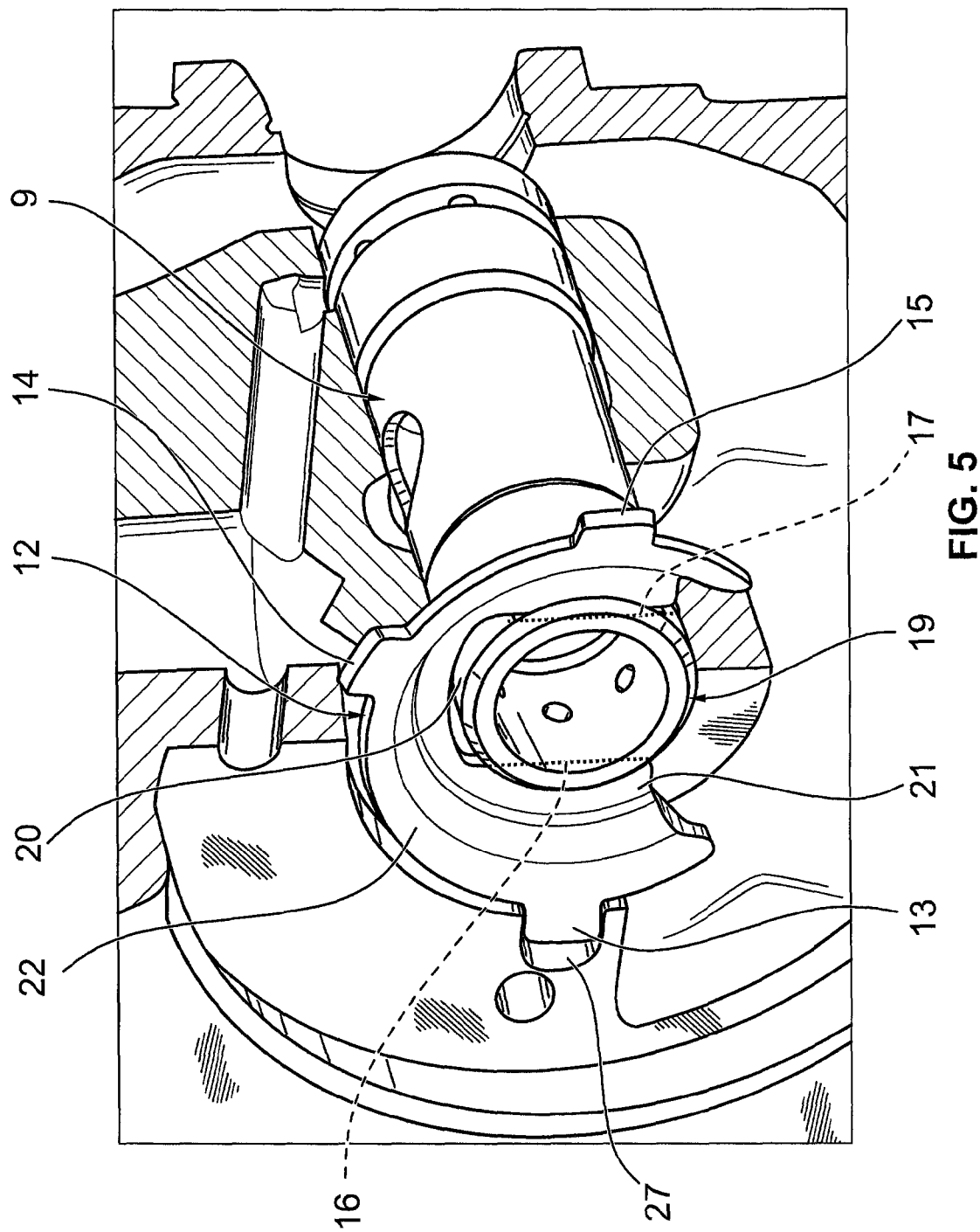
FIG. 5 shows a perspective illustration of the bearing housing with the bearing bush mounted therein, and with the rotation prevention means arranged on the bearing bush, from the direction of the compressor.
Figure 6:
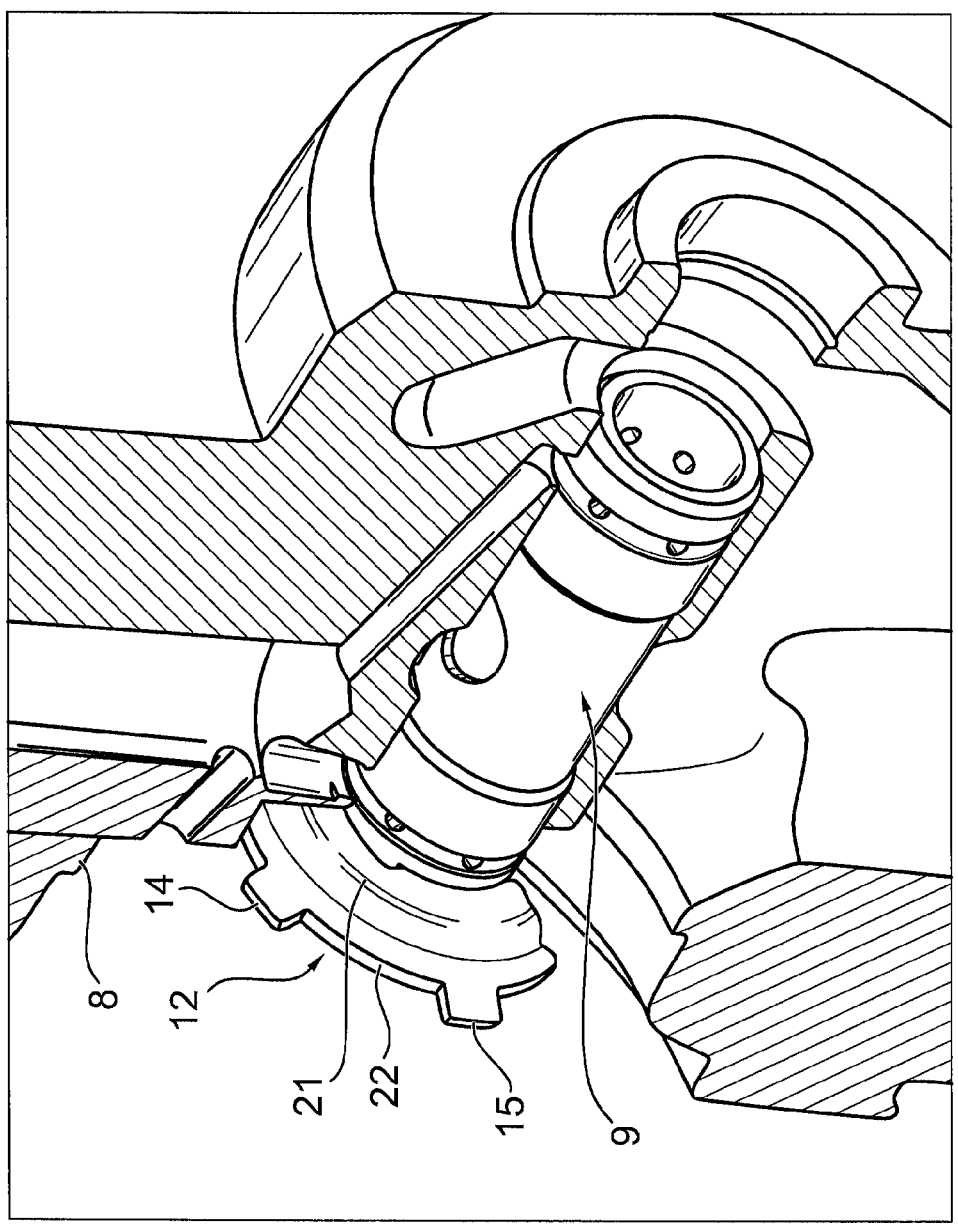
FIG. 6 shows an illustration, corresponding to FIG. 5, of the bearing housing, the bearing bush and the rotation prevention means, from the direction of the turbine.

In the mounted state of the bearing bush 9 in the bearing housing 8, as is shown in the illustration of FIGS. 4 to 6, the end region 19 of the bearing bush 9 has been inserted into the receiving recess 20, such that those wall regions 23 and 25 of the receiving recess 20 which are situated opposite one another engage into the grooves 16 and 17, as can be seen in particular from the illustration of FIG. 5. In said illustration, the grooves 16 and 17 are indicated by the dotted lines.

It can also be seen from the illustration of FIG. 5 that, in the mounted state of the rotation prevention means 12, the lugs 13, 14 and 15 are supported in the bearing housing 8. On account of the perspective illustration selected in FIG. 5, the support of the lug 13 in that region of the bearing housing 8 which is bordered by the oval is visible. For this purpose, the lug 13 engages into a recess 27 of the bearing housing 8. In the case of the provision of more than one lug, that is to say in the example the lugs 14 and 15, corresponding recesses are likewise provided in the bearing housing, but these are not visible on account of the illustration selected in FIGS. 4 to 6.

On account of the provision of grooves 16 and 17 into which the wall regions 23 and 25 engage, it is possible to maintain the axial mobility of the bearing bush 9 because the widths $B_{16}$ and $B_{17}$ of the grooves 16 and 17 respectively can be selected to be larger than the material thickness MS (see FIG. 3) of the wall regions 23 and 25. Therefore, the rotation prevention means 12 firstly can reliably prevent the bearing bush 9 from rotating in the bearing housing 8, but secondly ensures both radial and axial mobility.

Figure 7:
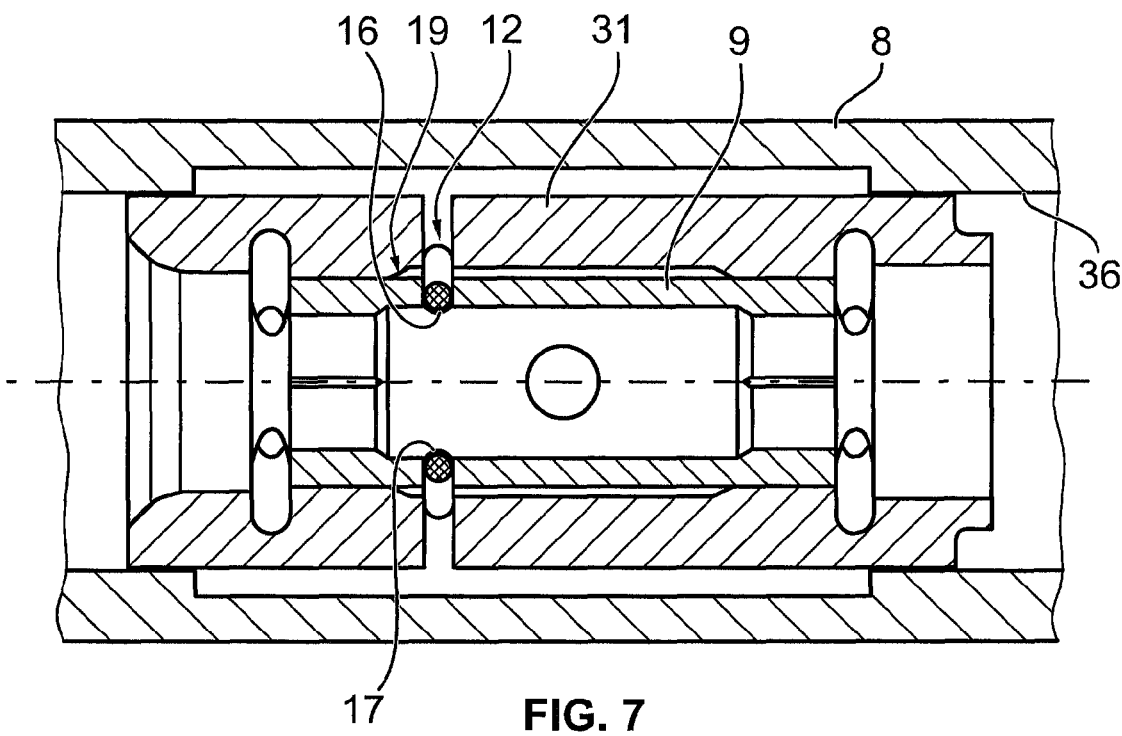
FIG. 7 shows a longitudinal section through the bearing housing and the bearing bush of the exhaust-gas turbocharger according to the invention for explaining a second embodiment.

FIG. 7 illustrates a second embodiment of the exhaust-gas turbocharger according to the invention, wherein in this case, a longitudinal section through the bearing housing 8 is illustrated, into the bearing housing bore 36 of which a bearing bush 31 is inserted, preferably pressed, such that the bearing sleeve 31 constitutes a static component.

Figure 8:
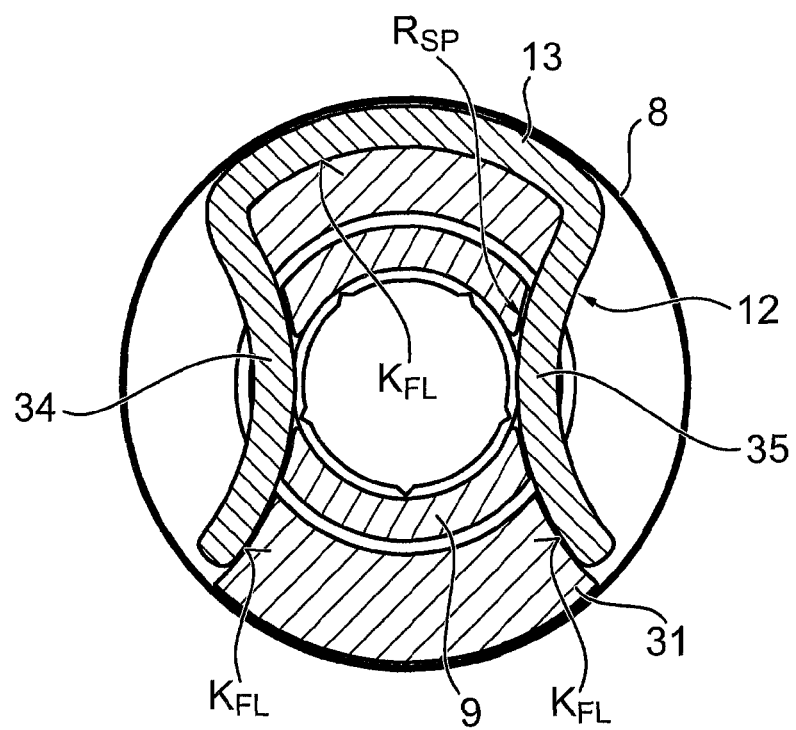
FIG. 8 shows a sectional end view of the arrangement according to FIG. 7.

As can be seen from the juxtaposition of FIGS. 7 to 9, in this embodiment, a rotation prevention means 12 in the form of a spring clip is provided, said spring clip having a lug 13 which engages into the bearing sleeve 31 such that, in this embodiment, indirect support of the rotation prevention means 12 in the bearing housing 8 is obtained.

As can be seen in particular from a juxtaposition of FIGS. 8 and 9, the spring clip 12 has for this purpose two clip legs 34 and 35 which adjoin the end regions 32 and 33 of the lug 13. Here, the clip legs 34 and 35 are curved concavely inward in the direction of the receiving recess 20, whereas the lug 13 is domed convexly outward away from the receiving recess 20, as is clear from FIG. 9.

On account of said design and suitable materials, the spring clip 12 has elastic properties and can engage resiliently into the grooves 16 and 17 of the bearing bush.

Here, FIG. 8 shows, by means of the three arrows $K_{FL}$, the contact surfaces at which the spring clip 12 makes contact with the bearing sleeve 31. The arrow $R_{SP}$ shows that a greater amount of radial play is realized in this embodiment.

For preferably axially small play, the spring clip may be machined axially at the locations indicated in FIG. 9 by the arrows $B_{AX}$.

From the juxtaposition of FIGS. 10 to 12, it is possible again to see the components of the rotation prevention means 12, designed in this embodiment as a spring clip, of the bearing sleeve 31 and of the bearing bush 9. Said components 12, 31 and 9, illustrated in each case as individual parts in FIGS. 10 to 12, may, as already explained above, be assembled by being plugged together to form a preassembled structural unit, such as is illustrated in the fully assembled state in FIG. 16.

This is explained in particular by FIGS. 13 to 15.

FIG. 13 shows a sectional view of the bearing sleeve 31, of the bearing bush 9 arranged therein, and of the clip or rotation prevention means 12 which has not yet been mounted. The section in FIG. 13 runs exactly through the grooves 16 and 17 which, as shown in FIG. 13, extend all the way through the wall material of the bearing bush 9, such that two diametrically oppositely arranged webs 41 and 42 are formed.

Corresponding grooves which extend all the way through the material of the bearing sleeve 31 are the grooves 37 and 38, wherein again, a web arrangement composed of the webs 39 and 40 is realized on the bearing sleeve 31, said webs 39 and 40 being situated facing the associated webs 41 and 42, as shown in FIG. 13.

The arrow M in FIG. 13 symbolizes the mounting direction of the spring clip 12. During insertion into the grooves, the clip legs 34 and 35 of said spring clip are pushed apart slightly by the web 39, such that during a continuation of the mounting movement corresponding to the arrow M, the clip legs 34 and 35 subsequently latch into the grooves 37 and 38 and, during the course of said latching action, also into the grooves 17 and 16 of the bearing bush 9. From this, it is clear that the bearing bush 9 is placed into its exact end position during the course of the mounting of the clip 12.

As symbolized by the arrows RF in FIG. 14, this results in a radially flexible fixing, wherein the lug 13 and the end regions 32 and 33 engage around the web 39.

In contrast, in the axial direction, an axially rigid fixing is obtained by means of the spring clip 12, as symbolized in FIG. 15 by the arrows AF. As already indicated above, said mounting of the bearing bush 9 within the bearing sleeve 31 by means of the spring clip 12 yields a preassembled structural unit, which is illustrated in its fully assembled state in FIG. 16.

FIG. 17 again illustrates the fully assembled state of said preassembled unit in the bearing housing 8. For this purpose, the preassembled unit shown in FIG. 16 is inserted into the mounting bore of the bearing housing 8, and the outer bearing sleeve 31 is fixed in the bearing housing 8 or in the bearing housing bore thereof, preferably by being pressed in. This yields the abovementioned indirect support of the bearing bush 9 in the bearing housing 8 as a result of the provision of the bearing sleeve 31.

FIGS. 18 and 19 illustrate a further embodiment of a preassembled mounting unit 45, which again comprises the bearing bush 9, the bearing sleeve 31 and a rotation prevention means 12. In the embodiment illustrated in FIGS. 18 and 19, the bearing bush 9 has for this purpose a groove 44 which may be one of the two grooves 16 and 17 of the embodiments explained above.

Accordingly, the bearing sleeve 31 has a correspondingly arranged groove 43, wherein, as can be seen from the juxtaposition of FIGS. 18 and 19, a rotational locking action is likewise obtained between the bearing bush 9 and the bearing sleeve 31 by means of the insertion of the rotation prevention means 12 firstly into the outer groove 43 of the bearing sleeve 31 and subsequently into the groove 44 of the bearing bush 9.

As can be seen from the illustration of FIG. 18, the rotational locking means 12 is designed as a disk segment which has a half-moon-shaped or semi-circular contour.

Even though in each case only one groove is provided both in the bearing bush and also in the bearing sleeve in the particularly preferred embodiment illustrated in FIGS. 18 and 19, at least the bearing bush 9 may also be used in the version depicted in the preceding embodiments, that is to say may have two diametrically oppositely arranged grooves.

In addition to the written disclosure above, reference is hereby additionally made, for further disclosure of the invention, to the illustrations in FIGS. 1 to 8.

LIST OF REFERENCE SYMBOLS

1 Exhaust-gas turbocharger
2 Compressor
3 Compressor wheel
4 Compressor housing
5 Turbine
6 Turbine wheel
7 Turbine housing
8 Bearing housing
9 Bearing bush
10 Rotor shaft
11 Bearing housing cover
12 Bearing bush rotation prevention means
13-15 Lugs of the rotation prevention means
16, 17 Grooves
18 Outer circumferential region
19 End region
20 Receiving recess
21 Main region
22 Edge region
23-25 Wall regions
26 Axial bearing
27 Recess in bearing housing 8
28 Support regions
29 Second end region
30 Insertion region
31 Bearing sleeve
32, 33 End regions
34, 35 Clip legs
36 Bearing housing bore
37, 38 Grooves of the bearing sleeve 31
39, 40 Webs of the bearing sleeve 31
41, 42 Webs of the bearing bush 9
43, 44 Grooves
45 Unit
$B_{16}$, $B_{17}$ Widths of the grooves 16 and 17 respectively
$B_{AX}$ Axially machined portion
$K_{FL}$ Contact surfaces
MS Material thickness of the wall regions 23, 25
$R_{SP}$ Radial play
AF Axial fixing (symbolized by arrows in FIGS. 14 and 15)
RF Radial fixing (symbolized by arrows in FIGS. 14 and 15).

The invention claimed is:

1. An exhaust-gas turbocharger (1) including:
a compressor (2) having a compressor wheel (3) in a compressor housing (4);
a turbine (5) which has a turbine wheel (6) in a turbine housing (7);
a rotor shaft (10) connecting the compressor wheel (3) and turbine wheel (6);
a bearing bush (9) for the rotor shaft (10), the bearing bush (9) having at least two radial grooves (16, 17);
a bearing housing (8) having a compressor side and a turbine side, and which receives the bearing bush (9) for the rotor shaft (10), and
a U-shaped bearing bush rotation prevention means (12) comprising at least one lug (13, 14, 15) supported in the bearing housing (8) and further comprising a receiving recess (20) delimited by two wall regions defining between them an opening whereby the U-shaped bearing bush rotation prevention means (12) can be inserted radially into the radial grooves of the bearing bush (9), which wall regions are arranged opposite one another and which delimit the receiving recess, which U-shaped bearing bush rotation prevention means (12) engages radially into at least one of said two radial grooves (16, 17) of the bearing bush (9),
wherein the radial grooves (16, 17) are arranged diametrically oppositely on an outer circumferential region (18) of the bearing bush (9).

2. The exhaust-gas turbocharger as claimed in claim 1, wherein the grooves (16, 17) are arranged on one end region (19) of the bearing bush (9).

3. The exhaust-gas turbocharger as claimed in claim 1, wherein the rotation prevention means (12) has a receiving recess (20) into which engages that end region (19) of the bearing bush (9) which is provided with the grooves (16, 17).

4. The exhaust-gas turbocharger as claimed in claim 3, wherein the rotation prevention means (12) has a main region (21) which is domed in the manner of a bowl and in which the receiving recess (20) is arranged.

5. The exhaust-gas turbocharger as claimed in claim 4, wherein the main region (21) has an encircling edge region (22) on which the at least one lug (13, 14, 15) is arranged.

6. The exhaust-gas turbocharger as claimed in claim 5, wherein three lugs (13, 14, 15) are provided which are arranged spaced apart at uniform intervals on the edge region (22).

7. An exhaust-gas turbocharger (1) including:
- a compressor (2) having a compressor wheel (3) in a compressor housing (4);
- a turbine (5) which has a turbine wheel (6) in a turbine housing (7);
- a rotor shaft (10) connecting the compressor wheel (3) and turbine wheel (6);
- a bearing bush (9) for the rotor shaft (10), the bearing bush (9) having at least two radial grooves (16, 17);
- a bearing housing (8) having a compressor side and a turbine side, and which receives the bearing bush (9) for the rotor shaft (10), and
- a bearing bush rotation prevention means (12) comprising at least one lug (13, 14, 15) supported in the bearing housing (8) and further comprising a receiving recess (20) delimited by two wall regions, which are arranged opposite one another and which delimit the receiving recess, which engages radially into at least one of said two radial grooves (16, 17) of the bearing bush (9),
- wherein the radial grooves (16, 17) are arranged diametrically oppositely on an outer circumferential region (18) of the bearing bush (9), and
- wherein the width ($B_{16}$, $B_{17}$) of the grooves (16, 17) is greater than the material thickness (MS) of the wall regions (23, 25), which delimit the receiving recess (20), of the bearing bush rotation prevention means (12).

8. The exhaust-gas turbocharger as claimed in claim 7, wherein the rotation prevention means (12) is formed as a sheet-metal part.

9. The exhaust-gas turbocharger as claimed in claim 7, wherein the rotation prevention means (12) is fixedly clamped, by means of its at least one lug (13, 14, 15), between the bearing housing (8) and an axial bearing (26) arranged in the bearing housing (8).

10. The exhaust-gas turbocharger as claimed in claim 7, wherein the at least one lug (13, 14, 15) engages into an associated recess (27) in the bearing housing (8).

11. The exhaust-gas turbocharger as claimed in claim 1, wherein a bearing sleeve (31) which is arranged around the bearing bush (9) is fixed in the bearing housing (8), and wherein at least one lug (13) of the rotation prevention means (12) engages into the bearing sleeve (31).

12. The exhaust-gas turbocharger as claimed in claim 11, wherein the rotation prevention means (12) is a spring clip.

13. The exhaust-gas turbocharger as claimed in claim 12, wherein the spring clip (12) has a lug (13), the end regions (32, 33) of which are adjoined by two clip legs (34, 35) which, together with the lug (13), delimit a receiving recess (20).

14. An exhaust-gas turbocharger (1) including:
- a compressor (2) having a compressor wheel (3) in a compressor housing (4);
- a turbine (5) which has a turbine wheel (6) in a turbine housing (7);
- a rotor shaft (10) connecting the compressor wheel (3) and turbine wheel (6);
- a bearing bush (9) for the rotor shaft (10), the bearing bush (9) having at least two radial grooves (16, 17);
- a bearing housing (8) having a compressor side and a turbine side, and which receives the bearing bush (9) for the rotor shaft (10), and
- a bearing bush rotation prevention means (12) comprising at least one lug (13, 14, 15) supported in the bearing housing (8) and further comprising a receiving recess (20), which engages into at least one of said two radial grooves (16, 17) of the bearing bush (9),
- wherein the radial grooves (16, 17) are arranged diametrically oppositely on an outer circumferential region (18) of the bearing bush (9),
- wherein a bearing sleeve (31) which is arranged around the bearing bush (9) is fixed in the bearing housing (8),
- wherein at least one lug (13) of the rotation prevention means (12) engages into the bearing sleeve (31),
- wherein the rotation prevention means (12) is a spring clip,
- wherein the spring clip (12) has a lug (13), the end regions (32, 33) of which are adjoined by two clip legs (34, 35) which, together with the lug (13), delimit a receiving recess (20), and
- wherein the clip legs (34, 35) are curved inwardly in the direction of the receiving recess (20).

15. The exhaust-gas turbocharger as claimed in claim 7, wherein the static bearing bush (9) is designed as a plain bearing bush.

16. The exhaust-gas turbocharger as claimed in claim 13, wherein in the fully assembled state, the lug (13) and the end regions (32, 33) of the clip (12) engage around a web (39) of the bearing sleeve (31).

17. The exhaust-gas turbocharger as claimed in claim 1, wherein the rotation prevention means (12) is a disk segment.

18. The exhaust-gas turbocharger as claimed in claim 17, wherein the disk segment is of half-moon-shaped or semicircular design.

19. The exhaust-gas turbocharger as claimed in claim 1, wherein a bearing sleeve (31) which is arranged around the bearing bush (9) is fixed by pressing into the bearing housing (8), and wherein the at least one lug (13) of the rotation prevention means (12) engages into the bearing sleeve (31).

* * * * *